US009644136B2

(12) United States Patent
Guan et al.

(10) Patent No.: US 9,644,136 B2
(45) Date of Patent: May 9, 2017

(54) LOW PH CROSSLINKING OF POLYMERS

(71) Applicants: ConocoPhillips Company, Houston, TX (US); University of Kansas, Lawrence, KS (US)

(72) Inventors: Huili Guan, Lawrence, KS (US); Cory Berkland, Lawrence, KS (US); Ahmad Moradi-Araghi, Tulsa, OK (US); Jenn-Tai Liang, Lawrence, KS (US); Terry M. Christian, Bartlesville, OK (US); Riley B. Needham, Bartlesville, OK (US); James H. Hedges, Bartlesville, OK (US); Min Cheng, Bartlesville, OK (US); Faye L. Scully, Bartlesville, OK (US)

(73) Assignees: ConocoPhillips Company, Houston, TX (US); University of Kansas, Lawrence, KS (US)

( * ) Notice: Subject to any disclaimer, the term of this patent is extended or adjusted under 35 U.S.C. 154(b) by 424 days.

(21) Appl. No.: 14/173,901

(22) Filed: Feb. 6, 2014

(65) Prior Publication Data

US 2014/0238702 A1  Aug. 28, 2014

Related U.S. Application Data

(60) Provisional application No. 61/768,007, filed on Feb. 22, 2013.

(51) Int. Cl.
 *C09K 8/588* (2006.01)
 *E21B 43/16* (2006.01)
 *C09K 8/594* (2006.01)

(52) U.S. Cl.
 CPC ............ *C09K 8/594* (2013.01); *E21B 43/164* (2013.01); *Y02P 90/70* (2015.11)

(58) Field of Classification Search
 CPC ..................................................... E21B 43/164
 USPC .................................. 507/225; 166/400, 402
 See application file for complete search history.

(56) References Cited

U.S. PATENT DOCUMENTS

| 4,498,539 A | * | 2/1985 | Bruning | ................ | C09K 8/512 |
| | | | | | 166/294 |
| 4,569,393 A | * | 2/1986 | Bruning | ................ | C09K 8/512 |
| | | | | | 166/270 |
| 4,658,898 A | | 4/1987 | Paul | | |
| 4,673,038 A | * | 6/1987 | Sandiford | ................ | C09K 8/92 |
| | | | | | 166/270 |

(Continued)

FOREIGN PATENT DOCUMENTS

WO  PCT/US14/014985  5/2014

OTHER PUBLICATIONS

Martin, F. D. et al., "Chemical Gels for Diverting CO2: Baseline Experiments," Paper SPE 16728, presented at the 62nd Ann. Tech. Conf. and Exhib., Dallas, TX, Sep. 27-30, 1987.

(Continued)

*Primary Examiner* — Aiqun Li
(74) *Attorney, Agent, or Firm* — Boulware & Valoir

(57) ABSTRACT

The invention is directed to polymers that self-crosslink at acidic pH or can be crosslinked by phenolic agents in brine. Such polymers have lower viscosity and can be pumped deep into reservoirs, where they will cross link in situ, thus increasing their viscosity and/or form a gel and blocking thief zones. Methods of making and using such polymers are also provided.

6 Claims, 12 Drawing Sheets

(56) References Cited

U.S. PATENT DOCUMENTS

| | | |
|---|---|---|
| 5,244,936 A | 9/1993 | Mitchell |
| 7,766,099 B2 | 8/2010 | Nguyen |
| 8,389,446 B2 | 3/2013 | Moradi-Araghi |
| 8,669,214 B2 | 3/2014 | Moradi-Araghi |
| 8,691,736 B2 | 4/2014 | Moradi-Araghi |
| 2011/0036580 A1 | 2/2011 | Morrow |

OTHER PUBLICATIONS

Martin, F. D. et al., "Gels for CO2 Profile Modification", Paper SPE 17330, presented at SPE/DOE Enhanced Oil Recovery Symposium, Tulsa, OK, Apr. 17-20, 1988.

Senol, N. N., "Laboratory Studies on Polymer Gels for CO2 Mobility Control at Bat Raman Heavy Oilfield, Turkey," Paper SPE 50798, Presented at 1999 SPE International Symposium on Oilfield Chemistry, Houston, TX, Feb. 16-18, 1999.

Hild, G. P. et al., "Reservoir Polymer Gel Treatments to Improve Miscible CO2 Flood," SPE Reservoir Eval. & Eng. 2 (2), Apr. 1999, pp. 196-204.

Asghari, K., et al., "Laboratory Investigation of in depth Gel Placement for Carbon Dioxide Flooding in Carbonate Porous Media," Paper SPE 90633, Presented at the 2004 SPE International Petroleum Conference, Mexico, Nov. 8-9, 2004.

Taabbodi, L. et al., "Application of In-Depth Gel Placement for Water and Carbon Dioxide Conformance Control in Carbonate Porous Media," Paper 2004-168 Presented at the 5th Canadian International Petroleum Conference, Calgary, Jun. 8-10, 2004.

Taabbodi, L. et al., "Application of In-Depth Gel Placement for Water and Carbon Dioxide Conformance Control in Carbonate Porous Media," JCPT, Feb. 2006, vol. 45, No. 2, pp. 33-40.

Freidmann, F., et al., "Development and Testing of a Foam-Gel Technology to Improve Conformance of Rangely CO2 Flood," SPE Reservoir Eval. & Eng. 2(2), Feb. 1999, pp. 4-13.

Wassmuth, F. R., et al., "Conformance Control for Miscible CO2 Floods in Fractured Carbonates," Paper 2005-243, presented at Canadian International Petroleum Conference, Calgary, Jun. 7-9, 2005.

Huh, C., et al., "A Rheological Model for pH-Sensitive Ionic Polymer Solutions for Optimal Mobility Control Applications," Paper SPE 96914 presented at 2005 Ann. Tech. Conf. and Exhibition, Dallas, TX, Oct. 9-12, 2005.

Sharma, M., "pH Sensitive Polymers for Improving Reservoir Sweep and Conformance," U.S. Department of Energy, National Energy Technology Laboratory, Semiannual Progress Report May 1, 2006 to Sep. 30, 2006.

Raje, M. et. al., "Gel Systems for Controlling CO2 Mobility in Carbon Dioxide Miscible Flooding," SPE Reservoir Eval. & Eng. 2 (2), Apr. 1999, pp. 205-210.

Raje, M. et. al., "Gel Systems for Controlling CO2 Mobility in Carbon Dioxide Miscible Flooding," Paper SPE/DOE 35379, presented at he 1988 SPE/DOE Tenth Symposium on Improved Oil Recovery, Tulsa, OK Apr. 21-24, 1998.

\* cited by examiner

LOW PH CROSSLINKING OF POLYMERS

CROSS-REFERENCE TO RELATED APPLICATIONS

This application claims priority to U.S. Ser. No. 61/768,007, filed Feb. 22, 2013, and expressly incorporated by reference herein it its entirety.

FEDERALLY SPONSORED RESEARCH STATEMENT

Not applicable.

REFERENCE TO MICROFICHE APPENDIX

Not applicable.

FIELD OF THE DISCLOSURE

This invention relates to compositions and processes for oil field applications. More specifically, this invention relates to polymers that can self-crosslink or crosslink with organic crosslinkers, such as phenol, resorcinol, catechin, and the like at low pH. Occurrence of such crosslinkings will result in the increase of polymer molecular weight and/or allow gel formation. These polymers can be applied to improve the performance of $CO_2$ flooding or Water-Alternative-Gas (WAG) and similar processes or acid diversion in acidizing applications.

BACKGROUND OF THE DISCLOSURE

Every day, oil and gas companies are challenged to produce as much of their oil reserves as possible. During the primary recovery stage, reservoir drive comes from a number of natural mechanisms. These include natural water pushing oil towards the well, expansion of the natural gas at the top of the reservoir, expansion of gas initially dissolved in the crude oil, and gravity drainage resulting from the movement of oil within the reservoir from the upper to the lower parts where the wells are located. Recovery factor during the primary recovery stage is typically about 5-15% under such natural drive mechanisms.

Over the lifetime of an oil well, however, the pressure will eventually fall, and at some point there will be insufficient underground pressure to force the oil to the surface. After natural reservoir drive diminishes, secondary and tertiary recovery methods are applied to further increase recovery.

Secondary recovery methods rely on the supply of external energy into the reservoir in the form of injecting fluids to increase reservoir pressure, hence replacing or increasing the natural reservoir drive with an artificial drive. In addition, pumps, such as beam pumps, gas lift assisted pumping, and electrical submersible pumps (ESPs), can be used to bring the oil to the surface. Secondary recovery techniques include increasing reservoir pressure by water injection, natural gas reinjection, and miscible injection with solvents such as $CO_2$, the most common of which is probably water injection.

Carbon dioxide ($CO_2$) flooding is a process whereby carbon dioxide is injected into an oil reservoir in order to increase output. When a reservoir's pressure is depleted through primary and secondary production, $CO_2$ flooding can be an ideal tertiary recovery method. It is particularly effective in reservoirs deeper than 2,000 ft., where $CO_2$ will be in a supercritical state (see FIG. 1), with API oil gravity greater than 20° and remaining oil saturations greater than 20%.

$CO_2$ is injected into oil reservoirs because it dissolves into oil easily, reduces oil viscosity, and can extract the light components of crude oil at sufficiently high pressure. Further, $CO_2$ can become miscible with oil at lower pressures than other gases, thus diluting the oil and making it more mobile.

If a well has been produced before and has been designated suitable for $CO_2$ flooding, the first step is to restore the pressure within the reservoir to one suitable for production. This is usually done by injecting water, which restores pressure within the reservoir to a suitable pressure. Once the reservoir is pressurized, $CO_2$ is injected into the same injection wells. The $CO_2$ gas is forced into the reservoir to come into contact with the oil. This creates a miscible zone of diluted oil that can be moved more easily to the production well. See e.g., FIG. 2. The $CO_2$ is also expected to reduce the pH of water in situ by 2-3 units, as $CO_2$ dissolves in the water making carbonic acid. This often results in acidic conditions.

$CO_2$ injection can be continuous, but is usually alternated with more water injections, so that the water acts to sweep the diluted oil towards the production zone, in a process known as Water-Alternating-Gas or "WAG." Water injection alone tends to sweep the lower parts of a reservoir, while gas injected alone sweeps more of the upper parts of a reservoir owing to gravitational forces. Three-phase gas, oil and water flow is better at displacing residual oil in the pore system than two-phase flow. WAG and SWAG (Simultaneous WAG) thus improve the efficiency of both microscopic and macroscopic displacement. The Weyburn oil field in Saskatchewan is a famous example where this method was applied. At Weyburn, waste $CO_2$ from a US industrial plant was used to give an additional $22 \times 10^6$ m$^3$ (140 MMSTB) oil production and disposal of $19 \times 10^6$ tons (350 Bscf) of $CO_2$.

However, the efficiency of various $CO_2$ injection procedures is not as good as it could be due to the very low viscosity of $CO_2$, which makes it easier to flow through high permeability zones and fractures—the so called "thief zones"—thus bypassing oil left behind in lower permeability zones.

Thief zones are usually blocked with polymers, foams, gels, and the like, thus forcing injection fluids through the less permeable zones. Gels produced with acrylamide-type polymers or xanthan gums have been used to block these fractures or high permeability streaks so subsequent fluids injected are diverted to the low permeability zones to improve sweep efficiency of $CO_2$ floods.

Gelled foams have also been used to block fractures and diverting the flow of $CO_2$ to lower permeability zones, improving sweep efficiency of $CO_2$ floods and reducing the cost by 50%.

The use of a pH-sensitive biopolymer that gels under acidic conditions has also been proposed. Solutions of a polysaccharide named "KUSP1" (an unbranched 1→3 D-Glucan) were gelled when exposed to lower pH values created by an ester hydrolysis. Such solutions also gelled when exposed to $CO_2$.

Gels produced with sulfomethylated resorcinol and formaldehyde tested in situ, reduce the permeability to $CO_2$ by about 99%.

Solutions of crosslinked polyacrylic acid hydrogels with pH-sensitivity have also been suggested for mobility control. However, such hydrogels exhibit lower viscosity values at the acidic pH ranges typically observed with $CO_2$ floods.

As such, these systems are not expected to perform well under $CO_2$ flood conditions. In fact, several polymers are less viscous at acidic pH. See e.g., FIG. 3 showing polyacrylamide, polyacrylic acid and various partially hydrolyzed polyacrylamides (PHPAM) at various pH's at 3 rpm in 0.5% brine.

Thus, what is needed in the art is a gel or polymer system that is easy to pump, yet becomes more viscous in situ, is resistant to washout, and is compatible with low pH and brine conditions.

SUMMARY OF THE DISCLOSURE

This disclosure is related to the production and use of homopolymers and copolymers that can self-crosslink or be crosslinked with a phenolic crosslinker, such as phenol, resorcinol or catechin, in brines at low pH values to result in viscosity increase and/or produce gels. Such gels are suitable for treating high permeability channels and fractures in oilfield reservoirs under $CO_2$ flooding conditions. Placement of these gels in thief zones should divert the flow of $CO_2$ to un-swept zones improving oil production. This disclosure covers the composition of each polymer and its production method as well as the use of such composition in enhanced oil recovery under $CO_2$ flooding.

One or more acrylamide based monomers and an optional phenolic crosslinker can be crosslinked at a low pH to form a gel suitable for diverting $CO_2$ to lower permeability zones increasing oil production. At least one of the acrylamide-based monomers must have a pendant hydroxyl group. Such a composition can be injected with $CO_2$ to lower the pH of the composition. This composition can also be injected into a field that has been flooded with $CO_2$. Furthermore, $CO_2$ can be injected after the injection polymer with or without the injection of a phenolic crosslinker such as catechin.

A copolymer of acrylamide (95 mole %) and N-hydroxymethylacrylamide (NHMA) (5 mole %) can be crosslinked with catechin, resorcinol and other phenolic derivatives at pH=3.2 to produce a gel suitable for diverting $CO_2$ to lower permeability zones increasing oil production.

A terpolymer of acrylamide, sodium 2-acrylamido-2-methylpropane sulfonate (NaAMPS) and NHMA can also be crosslinked with catechin, resorcinol and other phenolic derivatives to produce gels suitable to divert $CO_2$. Additional experiments performed also showed this terpolymer can self-crosslink at low pH to be suitable for diverting $CO_2$ to low permeability zones. Copolymers of NHMA with any other monomer can be similarly crosslinked.

Many acrylamide-based monomers with pendant hydroxyl groups can be used, including N-hydroxyethylacrylamide and N-(2-Hydroxypropyl)methacrylamide. However, the preferred monomer with a pendant hydroxyl group is hydroxymethylacrylamide.

Although our tests were performed at pH 3.2, we expect that a broader range of pH will prove functional. Furthermore, it is anticipated that the rate of viscosity increase can be slowed by increasing the pH, and vice versa, down to about pH 2 at which point, the polymer may begin to degrade. Thus, the polymers will gel at a pH range of 2-5, and polymerization may be possible albeit slower at pH 6. Polymers can self-crosslink at very low pH, e.g. pH 0.11. Gel stability also depends on temperatures. It is stable for 1-2 days at 65° C. and 1-2 weeks at 40° C. Gelation at very low pH can be used in acid diversion, where a long-term stability is not required.

The injection fluid can be any suitable fluid comprising water, including plain water and water and salts, e.g., brine. The injection fluid can also be buffered, as desired or needed to control the rate of gelation. Typical fluids used in downhole applications include seawater, riverwater, and produced water. $CO_2$ can be injected with the injection of the composition, before the composition, or after the composition. These steps will help to lower the pH and facilitate self-crosslinking and ultimately gel formation.

In addition to the polymers of the invention, the injection fluid may also contain other conventional additives including chelating agents to remove polymerization inhibitors, pH adjusters, initiators and other conventional additives, accelerators, retardants, as appropriate for the particular application. In addition, chemicals can be added that reduce the adsorption of gelation chemicals to the oil reservoir.

In its various embodiments, the invention may comprise one or more of the following:

One embodiment is a composition comprising a polymer with two or more acrylamide monomers in the repeat unit, wherein each monomer is different and one monomer has a pendant hydroxyl group, a fluid, and an optional phenolic crosslinker, wherein said polymer has a first viscosity at pH 8 and a second higher viscosity when aged at pH less than 5.

The monomer with the pendant hydroxyl group should be present in said polymer at levels ranging from 0.1-99%, or 1-25%, but preferably, from 1 to 5 mole percent.

Any acrylamide based monomers with pendant hydroxyl groups can be used, including N-hydroxyethylacrylamide, N-(2-Hydroxypropyl)methacrylamide or N-hydroxymethylacrylamide. N-hydroxymethylacrylamide is the preferred monomer with a pendant hydroxyl group.

The polymer can be a homopolymer such as poly(N-Hydroxymethylacrylamide) or a copolymer, in particular a poly(acrylamide-N-hydroxymethylacrylamide). The polymer could also be a terpolymer, such as poly[acrylamide-(sodium 2-acrylamido-2-methylpropane sulfonate)-N-hydroxymethylacrylamide].

The "optional" phenolic crosslinker can be present, or not, depending on user preference and/or reservoir characteristics. Where included it can be chosen from a group containing phenol, catechin, and resorcinol, and the like, and derivatives thereof. Examples of derivatives include, but are not limited to, phenyl acetate, salicyl alcohol, aspirin, m-cresol, phloroglucinol, quercetin, gallocatechin, naringenin, eriodictyol, and afzelechin and epimers thereof.

Another embodiment is a composition comprising poly(acrylamide-N-hydroxymethylacrylamide), a fluid, and a phenolic crosslinker. The fluid can be brine, seawater, produced water, river water, and the like.

Another embodiment is a composition comprising poly[acrylamide-(sodium 2-acrylamido-2-methylpropane sulfonate)-N-hydroxymethylacrylamide], a brine, and a phenolic crosslinker.

Method of improving sweep efficiency of a $CO_2$ flood of a reservoir is also provided. In one such embodiment, the method comprises injecting the compositions as herein described into said reservoir, aging the composition to increase its viscosity and/or form a gel; injecting a slug of $CO_2$ into said reservoir to mobilize the oil; and producing the mobilized oil.

Aging time can of course vary, based on temperature, pH, and concentration and proportion of components, but we have shown aging times ranging from 1-170 days, typically about 20-60 days, or about 30-40 days, although longer and shorter times can be achieved.

In some embodiments, one can inject alternating slugs of water, brine or other fluid with the $CO_2$.

Another improved method of $CO_2$ flooding is provided, wherein $CO_2$ is injected into a reservoir to mobilize and produce oil, the improvement comprising injecting any composition herein described into a reservoir, aging said composition long enough to increase its viscosity, injecting $CO_2$ into said reservoir to mobilize oil, and producing said oil.

Typically, a 0.2-20% polymer solution having 50-5000 ppm of optional phenolic crosslinking agent would be used, together with an injection fluid and any other additives that may be desired. Preferred amounts can be 0.4-10% polymer, and about 100-1000 ppm phenolic crosslinker.

In addition to the polymer, fluid and optional phenolic crosslinker, the injection fluid may also contain other conventional additives, including surfactants, chelating agents, initiators, accelerators, retardants, rheology modifiers, and the like as appropriate for the particular application.

Another improved method of Water-Alternating-Gas enhanced oil recovery is provided, wherein alternate slugs of brine and $CO_2$ are injected into a reservoir to mobilize and produce oil, the improvement comprising injecting slugs of $CO_2$ into said reservoir to mobilize oil, and producing said oil until production levels drop, then injecting any composition herein described into said reservoir, aging said composition in situ to increase its viscosity or form a gel, and further injecting alternate slugs of water and $CO_2$ into said reservoir to further mobilize oil, and producing said further mobilized oil.

As used herein ppm refers to weight ratio in parts per million, based on total weight.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", and "include" (and their variants) are open-ended linking verbs and allow the addition of other elements when used in a claim.

The phrase "consisting of" is closed transition phrase and does not allow the addition of other elements when used in a claim.

The phrase "consisting essentially of" occupies a middle ground, excluding material elements that change the nature of the invention, but not excluding immaterial additions, such as instructions for use, proppants, buffers, and the like.

The following abbreviations are used herein:

| Abbreviation | Meaning |
|---|---|
| RO | Reverse osmosis |
| MW | Average molecular weight |
| FB | Field brine |
| SW | Sea water |
| MMSTB | million stock tank barrels |
| Bscf | billion standard cubic feet |
| AM | Acrylamide |
| NaAMPS | sodium 2-acrylamido-2-methylpropane sulfonate |
| NHMA | N-hydroxymethylacrylamide |
| PHPAM | Partially hydrolyzed polyacrylamides |
| PSH | polyoxyethylene sorbitol hexaoleate |

DESCRIPTION OF EMBODIMENTS OF THE INVENTION

The invention provides novel polymers that gel under the acidic conditions typical of $CO_2$ floods in situ and have particular utility in blocking thief zones of reservoirs, but other uses are possible. For example, such materials can be used for oil and gas well stimulation/clean-up treatments with acid. In addition, such materials can also be used in mining, soil remediation, agriculture, and other environments where low pH gelation would be beneficial.

Preparation of Co- and Terpolymers

Figure 1:
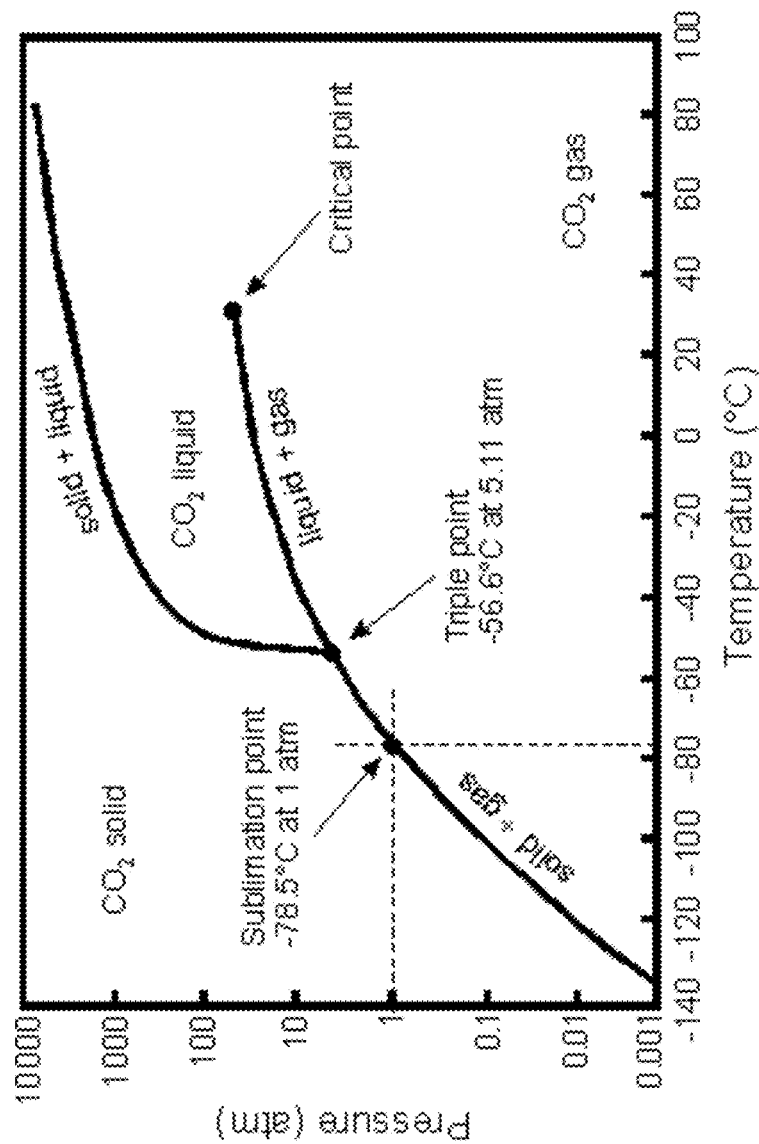
FIG. 1. Carbon dioxide pressure-temperature phase diagram.
Figure 2:
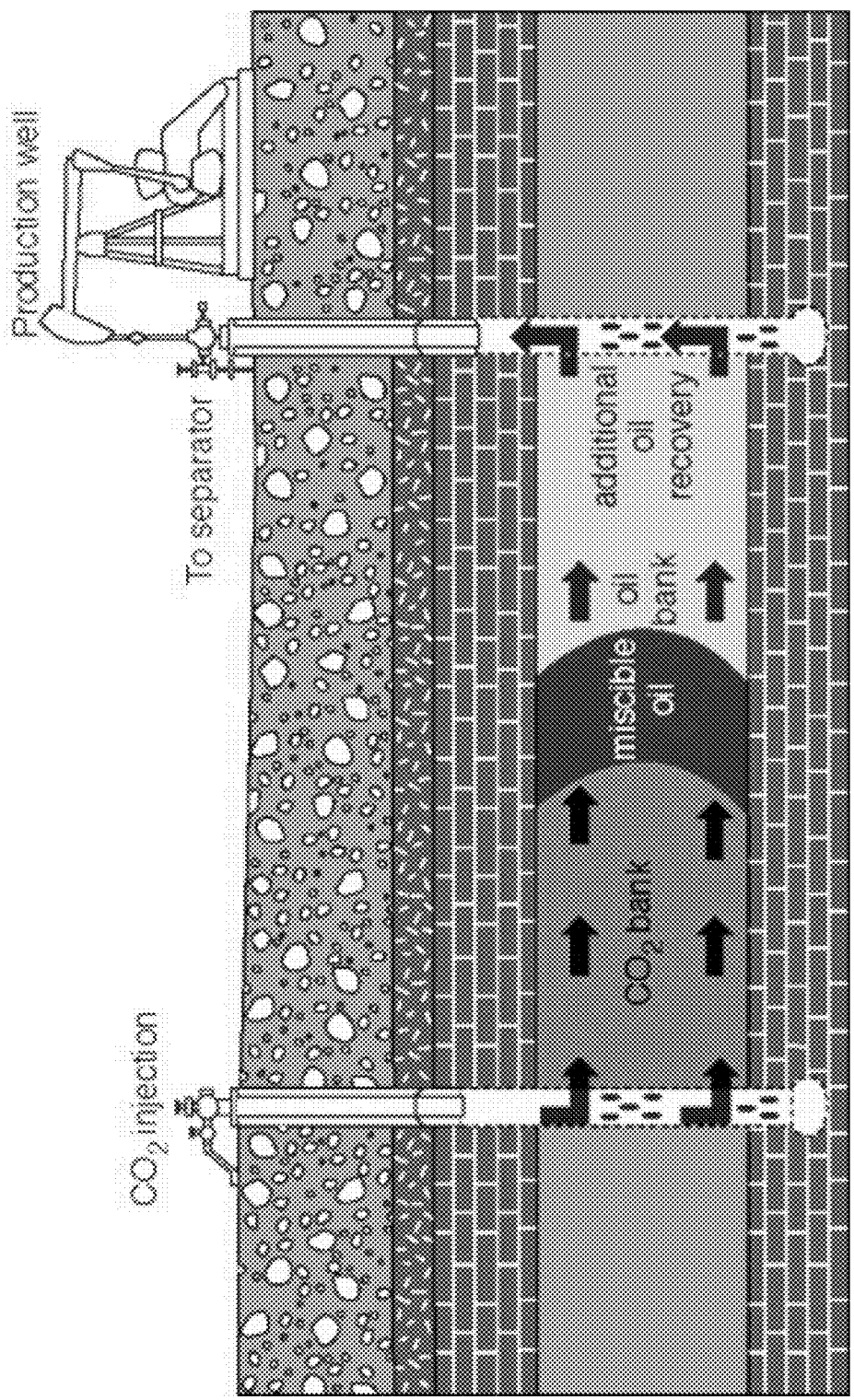
FIG. 2. $CO_2$ flooding process.
Figure 3:
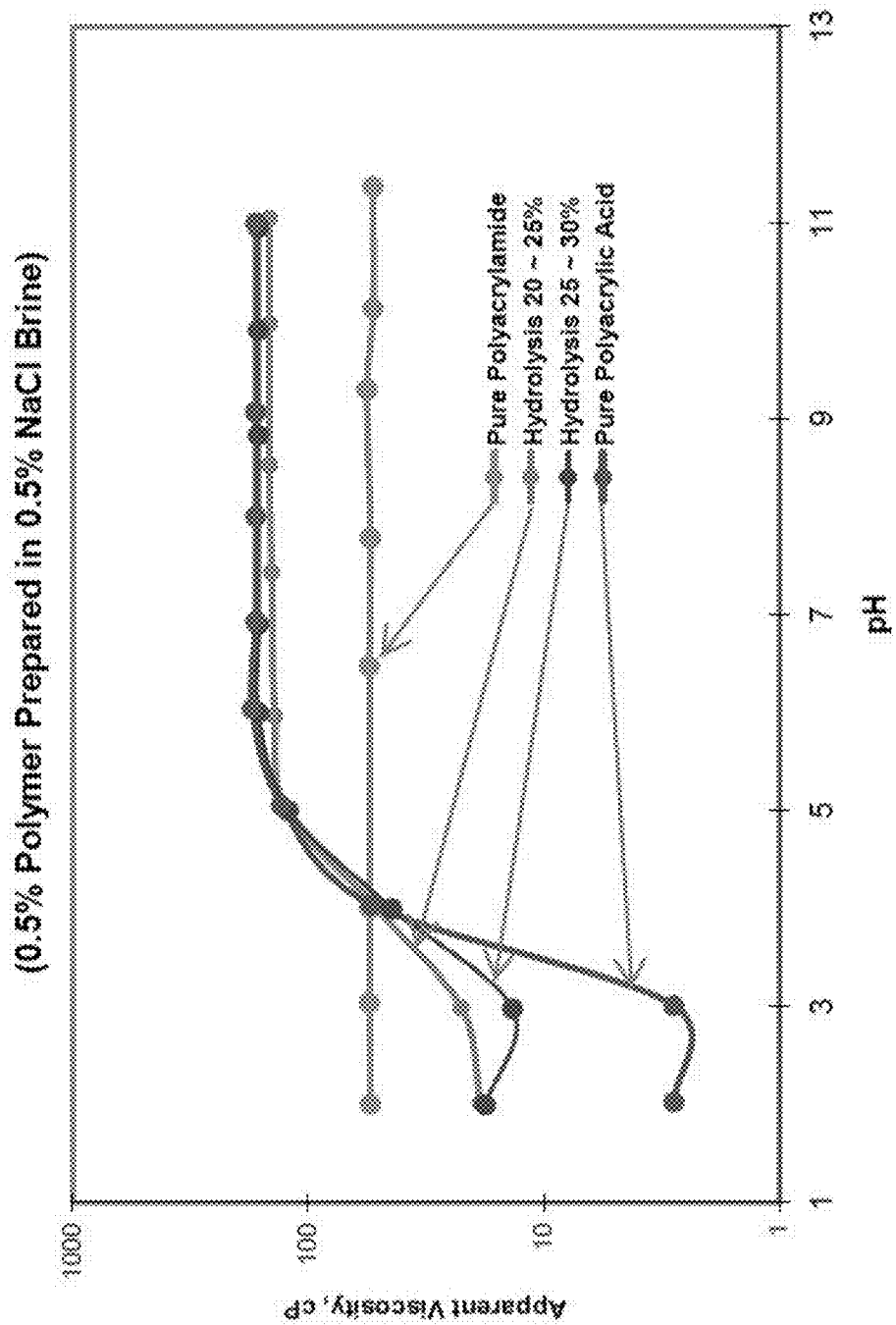
FIG. 3. Viscosity of 4 polymers over a range of pH's at 3 rpm.
Figure 4:
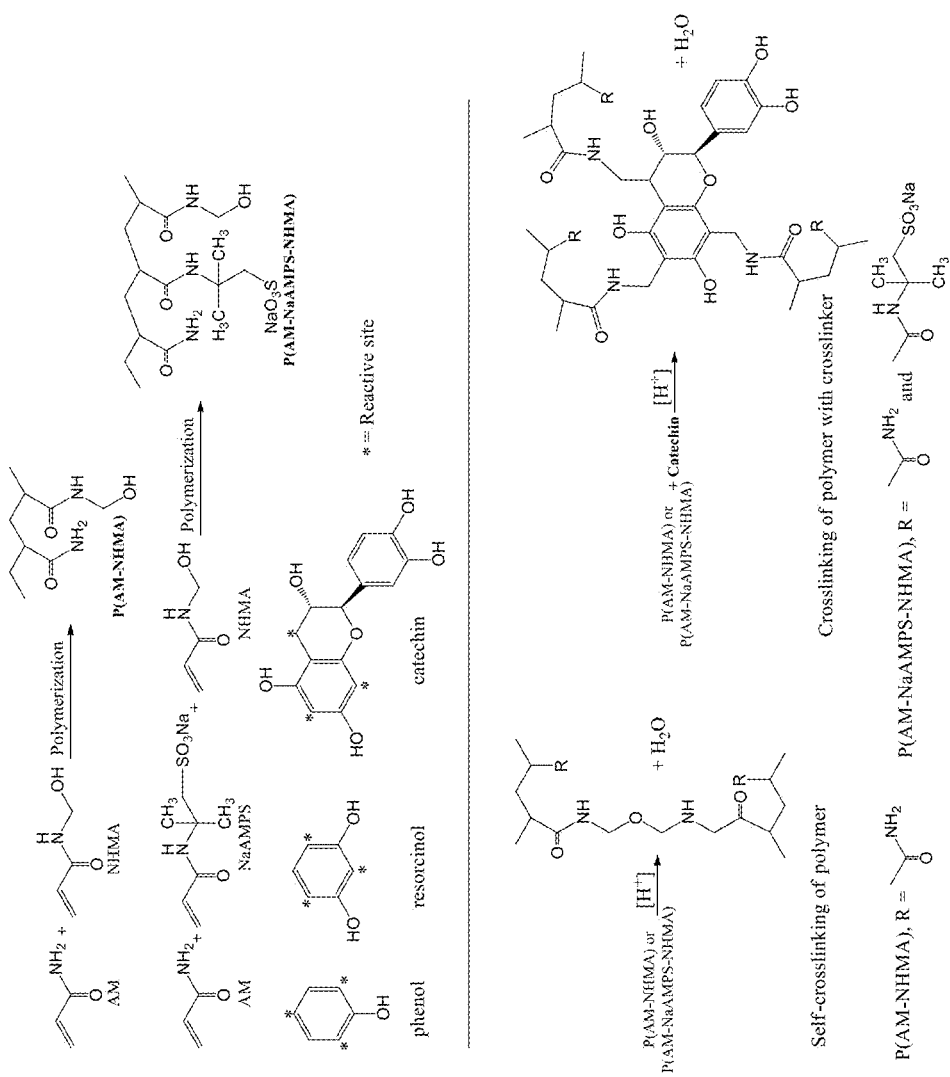
FIG. 4 depicts the synthesis of exemplary polymers that can self-crosslink or crosslink with organic crosslinkers at low pH and the reactions of the polymers self-crosslinking or crosslinking with organic crosslinkers at low pH.

Synthesis of Poly(AM-NHMA): A representative copolymer poly(acrylamide-N-hydroxymethylacrylamide), hereinafter referred to as poly(AM-NHMA), was prepared containing 5 mol % N-hydroxymethylacrylamide (NHMA) and 95 mol % acrylamide (AM) using inverse-emulsion polymerization. FIG. 4A-C shows the polymerization of this composition and related polymers and related external crosslinkers.

An aqueous phase containing 18.0 g of acrylamide (AM) and 2.9 g of 48% NHMA in 19.10 g of RO water, and an oil phase of 20 g of kerosene, 2.3 g of Span 83 and 2.7 g of polyoxyethylene sorbitol hexaoleate (PSH) were used in the synthesis.

The inverse-emulsion was prepared by mixing the aqueous phase and the oil phase, followed by rapid homogenization using a homogenizer. After transferring the inverse-emulsion into a 250 ml flask, 38 mg VAZO® 52 was added as an initiator to this solution. This inverse-emulsion was then purged with nitrogen for 20 minutes and the polymerization was carried out in a 50-55° C. oil bath for 3-4 hours.

VAZO® 52 (2,2'-Azobis(2,4-dimethylvaleronitrile), available from DuPont) is a low-temperature, oil-soluble polymerization initiator, whose rate of decomposition is first-order and is unaffected by contaminants such as metal ions.

Other oil-soluble initiators that could be used include organic peroxides (e.g., benzoyl or lauroyl), azos (e.g. 2,2'-azobisisobutyrilonitrile (AIBN)), and the like.

Synthesis of Poly(AM-NaAMPS-NHMA): Poly[acrylamide-(sodium 2-acrylamido-2-methylpropane sulfonate)-N-hydroxymethylacrylamide] terpolymer [aka poly(AM-NaAMPS-NHMA)] was synthesized by introducing sodium 2-acrylamido-2-methylpropane sulfonate (sodium AMPS, NaAMPS) as an anionic monomer into a mixture of acrylamide (AM) and N-hydroxymethylacrylamide (NHMA) similar to the synthesis described above. The synthesis and repeating unit for poly(AM-NaAMPS-NHMA) are also shown in FIG. 4A.

A representative terpolymer of poly(AM-NaAMPS-NHMA) containing 5 mol % NHMA, 5 mol % NaAMPS and 90 mol % acrylamide (AM) was prepared using inverse-emulsion polymerization. An aqueous phase containing 15.41 g of AM, 5.60 g of 50% NaAMPS, and 2.54 g of 48% NHMA in 16.51 g of RO water, and an oil mixture containing 20 g of kerosene, 2.3 g of Span 83 and 2.7 g of PSH was used in the synthesis.

The inverse-emulsion was produced by mixing the aqueous phase and the oil phase, followed by rapid homogenization using a homogenizer. After transferring the inverse-emulsion into a 250 ml flask, 38 mg VAZO® 52 was added to this inverse-emulsion as an initiator. The resulting mixture was then purged with nitrogen for 20 minutes. The polymerization was continued at 50-55° C. in an oil bath for 3-4 hours.

Preparation of Brine

The brine composition used in the polymer gelation experiments is given below.

TABLE 1

Synthetic Brine Compositions

| | Ingredient | Moles |
|---|---|---|
| Brine A | NaCl | $3.93 \times 10^{-1}$ |
| pH = 5.5 | KCl | $2.03 \times 10^{-3}$ |
| | $CaCl_2 \cdot 2H_2O$ | $1.72 \times 10^{-3}$ |
| | $MgCl_2 \cdot 6H_2O$ | $5.27 \times 10^{-3}$ |
| | $Na_2SO_4$ | $1.02 \times 10^{-3}$ |
| | RO water | Volume adjusted to 1 L |
| Brine C | $Na_2HPO_4$ | $2.46 \times 10^{-2}$ |
| pH = 3.2 | Citric Acid | $3.77 \times 10^{-2}$ |
| | Brine A | Volume adjusted to 1 L |
| Brine D | NaCl | 1.71 |
| pH = 5.9 | KCl | $1.14 \times 10^{-2}$ |
| | $CaCl_2 \cdot 2H_2O$ | $7.06 \times 10^{-2}$ |
| | $MgCl_2 \cdot 6H_2O$ | $3.18 \times 10^{-2}$ |
| | $Na_2SO_4$ | $1.51 \times 10^{-2}$ |
| | RO water | Volume adjusted to 1 L |
| Brine E | NaCl | 1.70 |
| pH = 3.2 | KCl | $1.13 \times 10^{-2}$ |
| | CaCl2 2H2O | $7.01 \times 10^{-2}$ |
| | MgCl2 6H2O | $3.15 \times 10^{-2}$ |
| | Na2SO4 | $1.50 \times 10^{-2}$ |
| | Citric acid | $5.00 \times 10^{-2}$ |
| | NaOH | $7.03 \times 10^{-2}$ |
| | RO water | Volume adjusted to 1 kg |
| Brine G | Glycine | $5.0 \times 10^{-2}$ |
| pH = 3.2 | HCl | $4.1 \times 10^{-3}$ |
| | Brine A | Volume adjusted to 1 L |
| Brine P | $Na_2HPO_4$ | $5.0 \times 10^{-2}$ |
| pH = 3.2 | $H_3PO_4$ | $5.8 \times 10^{-2}$ |
| | Brine A | Volume adjusted to 1 L |
| Buffer P | Na2HPO4 | $2.46 \times 10^{-2}$ |
| pH = 3.2 | Citric Acid | $3.77 \times 10^{-2}$ |
| | RO water | Volume adjusted to 1 L |

For Synthetic Brine C, a pH of 3.2 was obtained with a citric acid and sodium phosphate buffering solution. Here, 123 ml of 0.2 M $Na_2HPO_4$ and 377 ml of 0.1 M citric acid was added to Synthetic Brine A without $NaHCO_3$.

For Synthetic Brine G, pH 3.2 was obtained with a glycine and HCl buffering solution. Here, 250 ml of 0.2 M glycine and 41 ml of 0.1 M HCl was added to Synthetic Brine A without $NaHCO_3$. Then, the solution was diluted to 1000 ml.

For Synthetic Brine P, pH 3.2 was obtained with a phosphate and $H_3PO_4$ buffering solution. Here, 7.10 g $Na_2HPO_4$ and 6.68 g of 85% $H_3PO_4$ were added to Synthetic Brine A without $NaHCO_3$. Then, the solution was diluted to 1000 ml.

For Buffer P, pH 3.2 was obtained with a citric acid and sodium phosphate buffering solution. Here, 123 ml of 0.2 M $Na_2HPO_4$ and 377 ml of 0.1 M citric acid were added to RO water. Then, the solution was diluted to 1000 ml.

Viscosity Measurements

The specific viscosity of the initial mixtures in the cross-linking and self-crosslinking experiments described below was determined by using a Brookfield Viscometer. The mixtures were then incubated at a pre-determined temperature for some pre-determined amount of time, after which, the viscosity of the mixtures were again measured. Viscosity increase above 1000 cP is presumed to coincide with gel formation, but this is not certain.

Crosslinking Experiments

Crosslinking of 0.5% poly(AM-NaAMPS-NHMA) with Catechin: 0.83 g of 30% inverting surfactant was added into 97.45 g of deoxygenated Synthetic Brine C in a beaker while stirring in an oxygen-free glove box. Then 1.67 g of 30% poly(AM-NaAMPS-NHMA) (5 mole % NaAMPS, 5 mole % NHMA) and 0.05 g catechin (500 ppm) were added into the above solution under stirring, respectively. FIG. 4C shows this crosslinking reaction for poly(AM-NsAMPS-NHMA) and related polymers.

Figure 6:
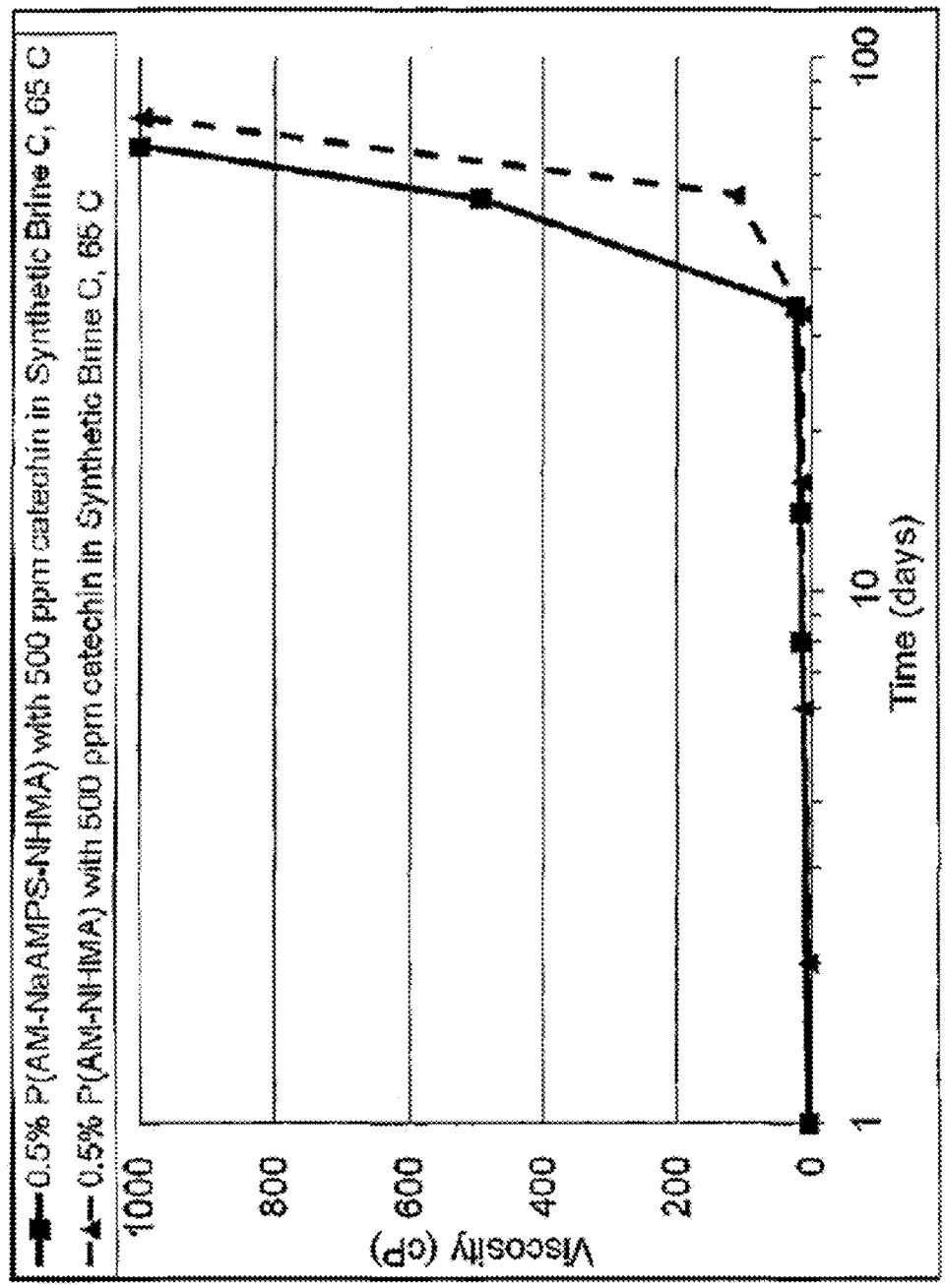
FIG. 6. Crosslinking of 0.5% poly(AM-NaAMPS-NHMA) and poly(AM-NHMA) with 500 ppm catechin in Synthetic Brine C at 65° C., respectively.

The initial viscosity of the solution was determined before dividing the rest of the solution into 6-ml vials. The vials were incubated at 65° C. for various lengths of time before removing a vial and measuring the viscosity of its content. The results for crosslinking of 0.5% poly(AM-NaAMPS-NHMA) with 500 ppm catechin in Synthetic Brine C are shown in FIG. 6. As this graph shows the viscosity of 0.5% poly(AM-NaAMPS-NHMA) solution containing 500 ppm catechin in Brine C increased with aging time, reaching a maximum of 1000 cP within 68 days of aging at 65° C.

Control experiment of 0.5% poly(AM-NaAMPS-NHMA): The initial crosslinking experiment was carried out in Synthetic Brine C, which contains citric acid. In order to verify the crosslinking not caused by citric acid, other low pH synthetic brines (Brine A) was used for additional crosslinking tests.

0.83 g of 30% inverting surfactant was added to 97.45 g of Synthetic Brine A in a beaker while stirring in an oxygen-free glove box; and then 1.67 g of 30% poly(AM-NaAMPS-NHMA) and 0.05 g catechin were added into the above solution under stirring, respectively. The initial viscosity of the solution was determined before dividing the rest of the solution into 6-ml vials. The vials were incubated at 65° C. for various lengths of time before removing the content of a vial and measuring the viscosity of the solution.

Figure 5:
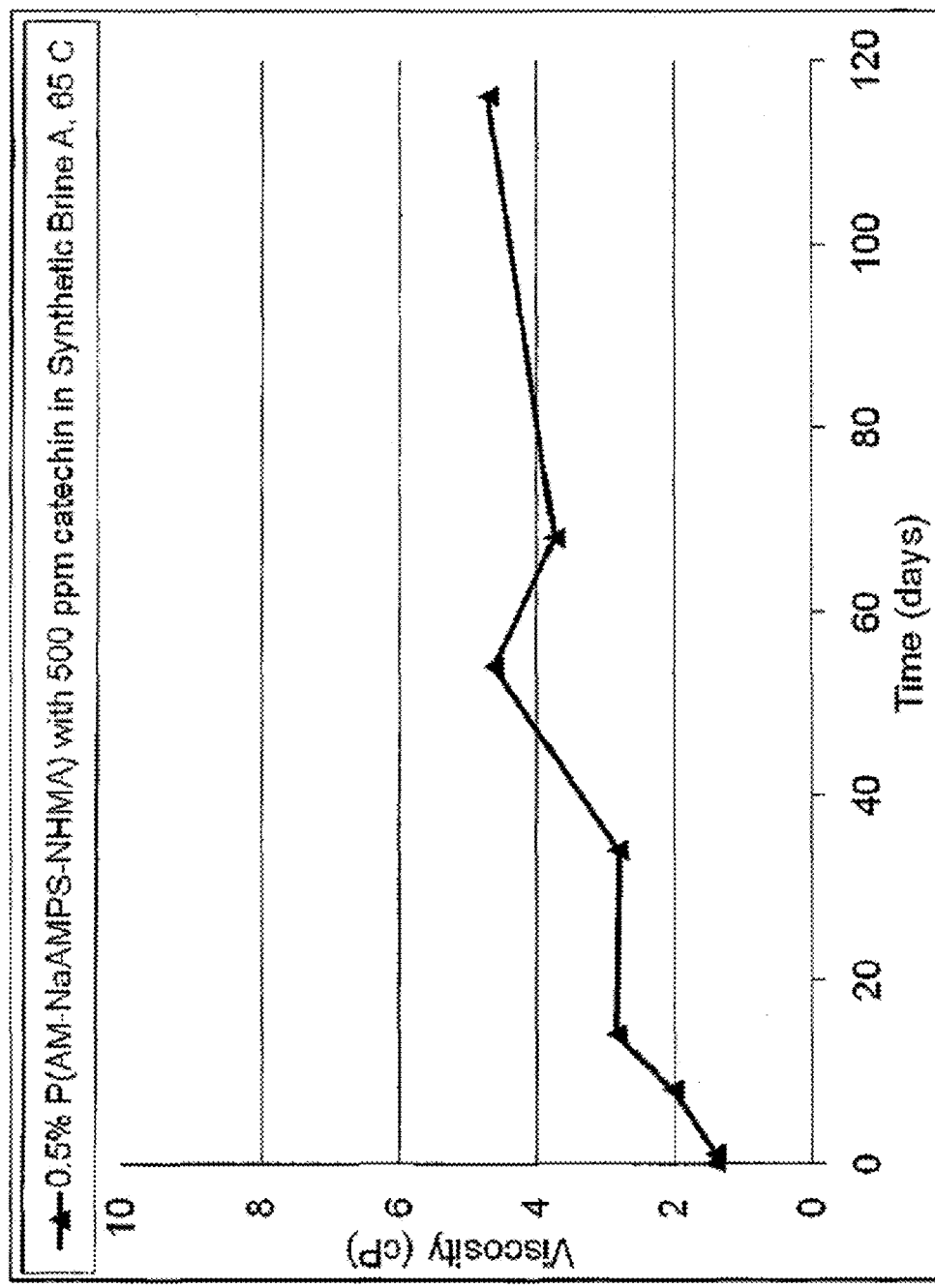
FIG. 5. Crosslinking of 0.5% poly(AM-NaAMPS-NHMA) with 500 ppm catechin in Synthetic Brine A at 65° C.

The results for incubation of 0.5% poly(AM-NaAMPS-NHMA) with 500 ppm catechin in Synthetic Brine A are shown in FIG. 5. No significant change in viscosity of this solution was observed in 120 days of aging at 65° C. As will become obvious in the following examples, this shows that a lower pH is necessary to promote self-crosslinking, or crosslinking can be achieved with a phenolic compound.

Crosslinking of 0.5% poly(AM-NHMA) (5 mole % NHMA) with Catechin: 0.83 g of 30% inverting surfactant was added into 97.45 g deoxygenated Synthetic Brine C in a beaker while stirring in an oxygen-free glove box; and then 1.67 g of 30% poly(AM-NHMA) and 0.05 g catechin were added into the above solution under stirring, respectively. The initial viscosity of the solution was determined before dividing the rest of the solution into 6-ml vials. The vials were incubated at 65° C. for various lengths of time before measuring the viscosity of their content. The results for crosslinking of 0.5% poly(AM-NHMA) with 500 ppm catechin in Synthetic Brine C are also shown in FIG. 6. The viscosity of this solution increased with aging time and reached a maximum of 1000 cP in 70 days of aging at 65° C.

Self-crosslinking of 0.7% poly(AM-NHMA): 0.58 g of 30% inverting surfactant was added to 48.25 g of deoxygenated Synthetic Brine G in a beaker with stirring in an oxygen-free glove box. We then added 1.17 g of 30% poly(AM-NHMA) to this solution under stirring. The initial viscosity of the resulting polymer solution was determined before dividing the rest of the solution into 6-ml vials. The vials were incubated at 65° C. for various lengths of time before removing one vial at a time, transferring its content and measuring viscosity of the solution. FIG. 4B shows the self-crosslinking reaction for poly(AM-NHMA) and related polymers.

Figure 7:
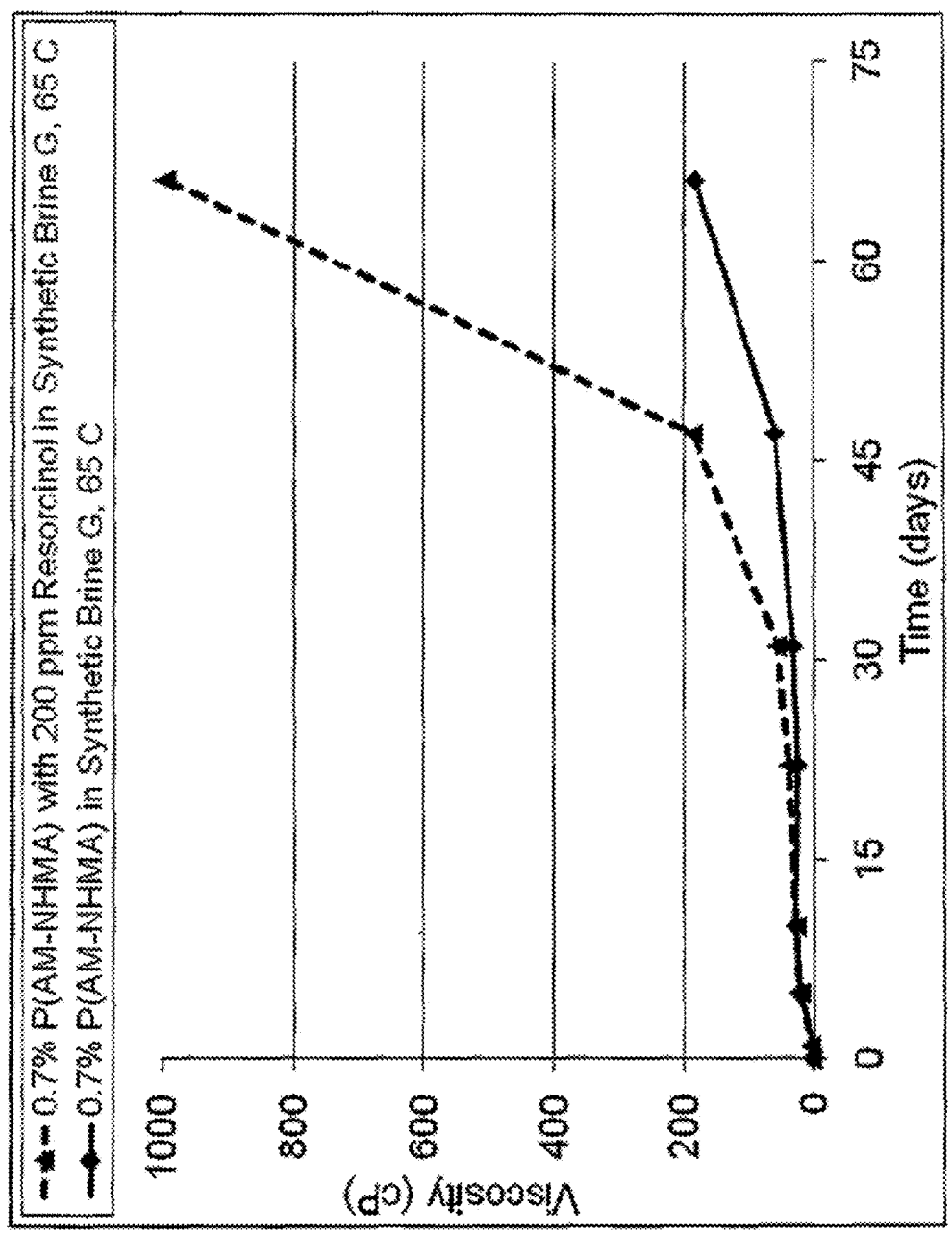
FIG. 7. Self-crosslinking of 0.7% poly(AM-NHMA) and crosslinking of 0.7% poly(AM-NHMA) with 200 ppm resorcinol in Synthetic Brine G at 65° C.

The results for self-crosslinking of poly(AM-NHMA) in Synthetic Brine G are also shown in FIG. 7. The viscosity of the solution increased with aging time at 65° C., reaching 180 cP in 66 days of aging at 65° C. Although low, the viscosity of $CO_2$ is substantially lower than 1, thus a viscosity of 180 would still function to divert $CO_2$.

Crosslinking of 0.7% poly(AM-NHMA) with Resorcinol: 0.58 g of 30% inverting surfactant was added into 48.25 g of deoxygenated Synthetic Brine G in a beaker while stirring in an oxygen-free glove box. Then 1.17 g of 30% poly(AM-NHMA) and 0.010 g (~200 ppm) resorcinol were added into the above solution under stirring, respectively. The initial viscosity of the solution was determined before dividing the rest of the solution into 6-ml vials. The vials were incubated at 65° C. for various lengths of time before measuring the viscosity of their content. The results for crosslinking of 0.7% poly(AM-NHMA) with 200 ppm resorcinol in Synthetic Brine G are shown in FIG. 7. As can be seen, the viscosity of the mixture in brine G increased with aging time, reaching a maximum of about 1000 cP in 66 days of aging at 65° C.

Figure 8:
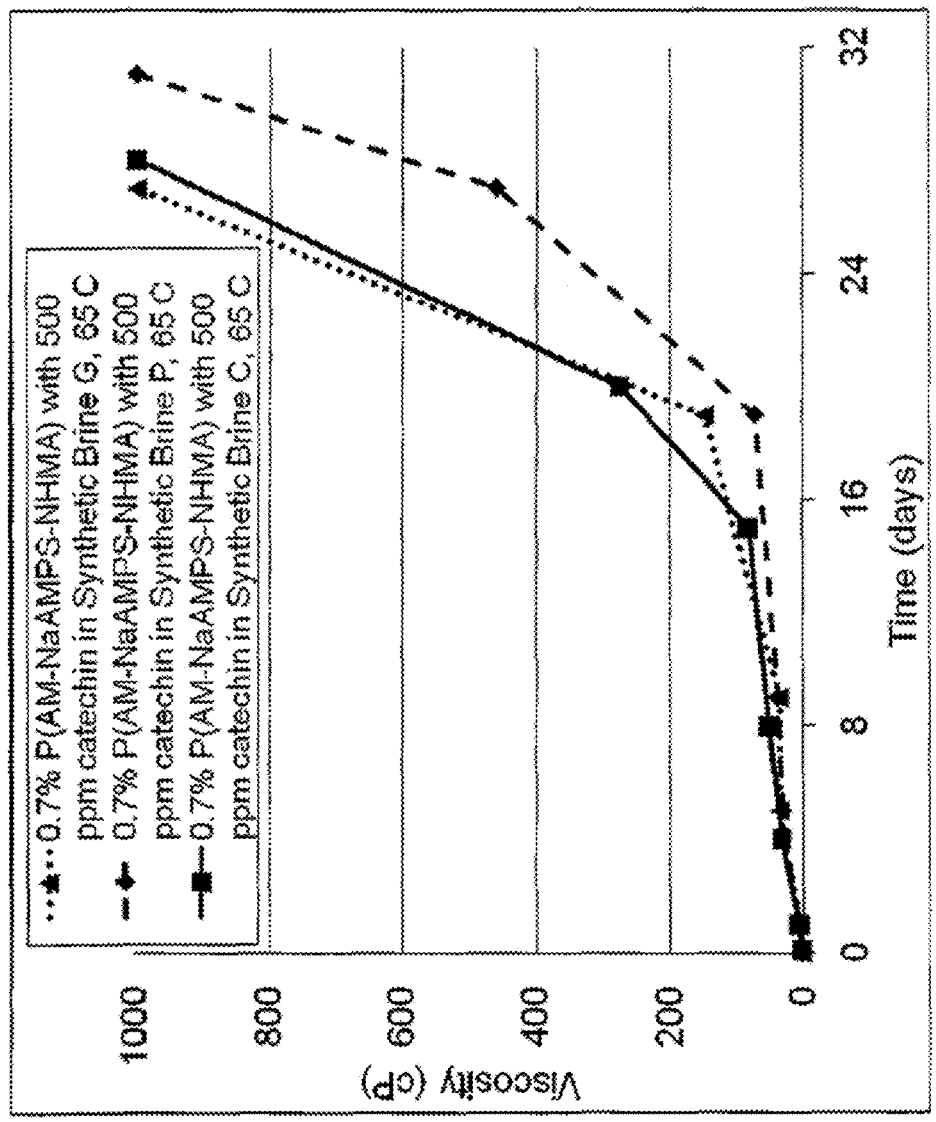
FIG. 8. Crosslinking of 0.5% poly(AM-NaAMPS-NHMA) with 500 ppm catechin in Synthetic Brine C, G and P at 65° C.

Crosslinking of 0.7% poly(AM-NaAMPS-NHMA) with Catechin: 0.58 g of 30% inverting surfactant was added into 48.25 g of deoxygenated Synthetic Brine C in a beaker with stirring in an oxygen-free glove box; and then 1.17 g of 30% poly(AM-NaAMPS-NHMA) and 0.025 g (500 ppm) catechin were added into the above solution under stirring, respectively. The initial viscosity of the solution was determined before dividing the rest of the solution into 6-ml vials. The vials were incubated at 65° C. for various lengths of time before measuring the viscosity of their content. The results for crosslinking of 0.7% poly(AM-NaAMPS-NHMA) with 500 ppm catechin in Synthetic Brine C are shown in FIG. 8.

Crosslinking experiments of 0.7% poly(AM-NaAMPS-NHMA) with 500 ppm Catechin in Synthetic Brine G and P at 65° C. were also carried out using the above procedure. The results for crosslinking of 0.7% poly(AM-NaAMPS-NHMA) with 500 ppm catechin in Synthetic Brine G and P are also shown in FIG. 8.

As this graph indicates, the viscosity of the mixture in brine C began to rise in 4 days, reaching a maximum of about 1000 cP in 28 days of aging at 65° C. A similar result was observed for the solution aged in brine G at 65° C. The viscosity of the solution prepared in Brine P increased with aging time, reaching a maximum of about 1000 cP in 30 days of aging at 65° C. Therefore, crosslinking of poly(AM-NaAMPS-NHMA) with catechin produces gels that could be used to divert $CO_2$ to lower permeability zones. Brine P may need longer time to reach the same viscosity, because the buffering system is made from an acid and its salt.

Self-crosslinking of 1% poly(AM-NaAMPS-NHMA): 1.67 g of 30% inverting surfactant was added to 95.00 g of deoxygenated buffer P (pH=3.2) in a beaker while stirring in an oxygen-free glove box. We then added 3.33 g of 30% poly(AM-NaAMPS-NHMA) to this solution under stirring. Then, the rest of the solution was divided into 6-ml vials. The vials were incubated at 40° C. for various lengths of time before removing one vial at a time, transferring its content and measuring viscosity of the solution from the vial.

Figure 9:
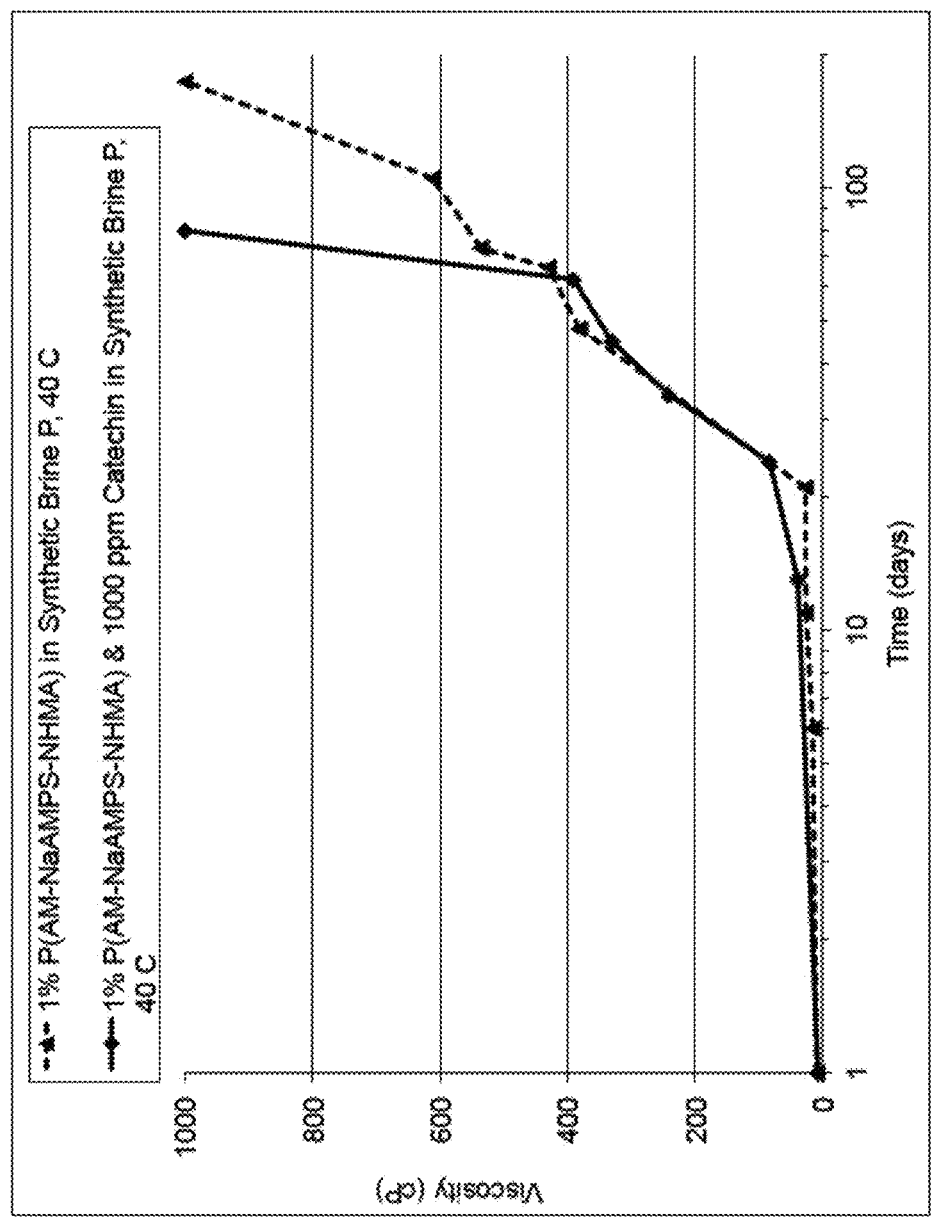
FIG. 9. Self-crosslinking of 1% poly(AM-NaAMPS-NHMA) and crosslinking of 1% poly(AM-NaAMPS-NHMA) with 1000 ppm catechin in pH 3.2 buffer P at 40° C.

The results for self-crosslinking of poly(AM-NaAMPS-NHMA) in pH 3.2 buffer P are shown in FIG. 9. As this graph shows, the viscosity of the solution increased with aging time at 40° C., reaching a maximum of about 1000 cP after 170 days.

Crosslinking of 1% poly(AM-NaAMPS-NHMA) with catechin: 1.67 g of 30% inverting surfactant was added to 94.90 g of deoxygenated pH 3.2 buffer P in a beaker while stirring in an oxygen-free glove box; and then 3.33 g of 30% poly(AM-NaAMPS-NHMA) and 0.10 g catechin (1000 ppm) were added into the above solution under stirring, respectively. The initial viscosity of the solution was determined before dividing the rest of the solution into 6-ml vials. The vials were incubated at 40° C. for various lengths of time before removing a vial and measuring the viscosity of its content.

The results for crosslinking of 1% poly(AM-NaAMPS-NHMA) with 1000 ppm catechin in pH 3.2 buffer P are also shown in FIG. 9. As with the self-crosslinking experiment, the viscosity increased with aging time, reaching a value of about 1000 cP after 80 days of aging at 40° C.

Self-crosslinking of 1% poly(AM-NaAMPS-NHMA) in Synthetic Buffer E: 1.67 g of 30% inverting surfactant was added to 95.00 g of deoxygenated Synthetic Brine E (pH=3.2) in a beaker while stirring in an oxygen-free glove box. Then, 3.33 g of 30% poly(AM-NaAMPS-NHMA) was added to this solution under stirring. The rest of the solution was divided into 6-ml vials. The vials were incubated at 40° C. for various lengths of time before removing one vial at a time, transferring its content and measuring viscosity of the solution from the vial.

Figure 10:
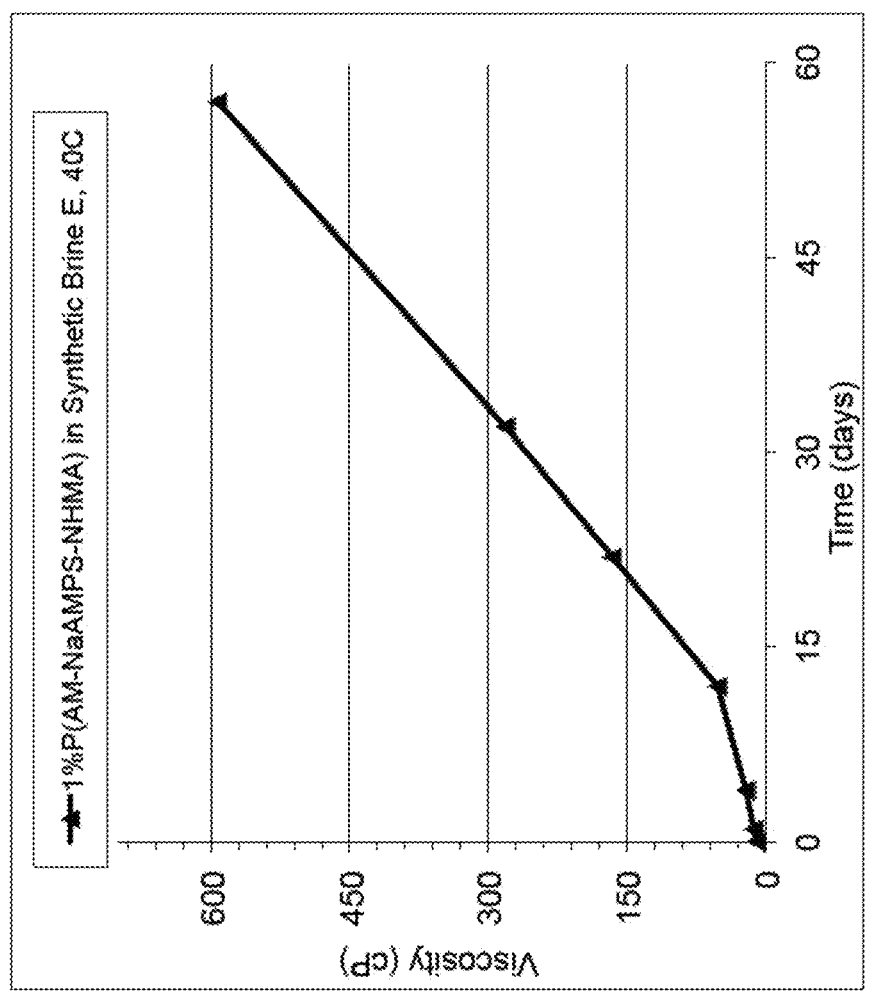
FIG. 10. Self-crosslinking of 1% poly(AM-NaAMPS-NHMA) in Synthetic Brine E at 40° C.

The results for self-crosslinking of poly(AM-NaAMPS-NHMA) in pH 3.2 Synthetic Brine E are shown in FIG. 10. As this graph shows, the viscosity of the solution increased with aging time at 40° C., reaching about 600 cP after around 60 days.

Self-crosslinking of 1% poly(AM-NHMA) in Synthetic Brine E: 1.67 g of 30% inverting surfactant was added to 95.00 g of deoxygenated Synthetic Brine E (pH=3.2) in a beaker while stirring in an oxygen-free glove box. Then, 3.33 g of 30% poly(AM-NaAMPS-NHMA) was added to this solution under stirring. The rest of the solution was divided into 6-ml vials. The vials were incubated at 40° C. for various lengths of time before removing one vial at a time, transferring its content and measuring viscosity of the solution from the vial.

Figure 11:
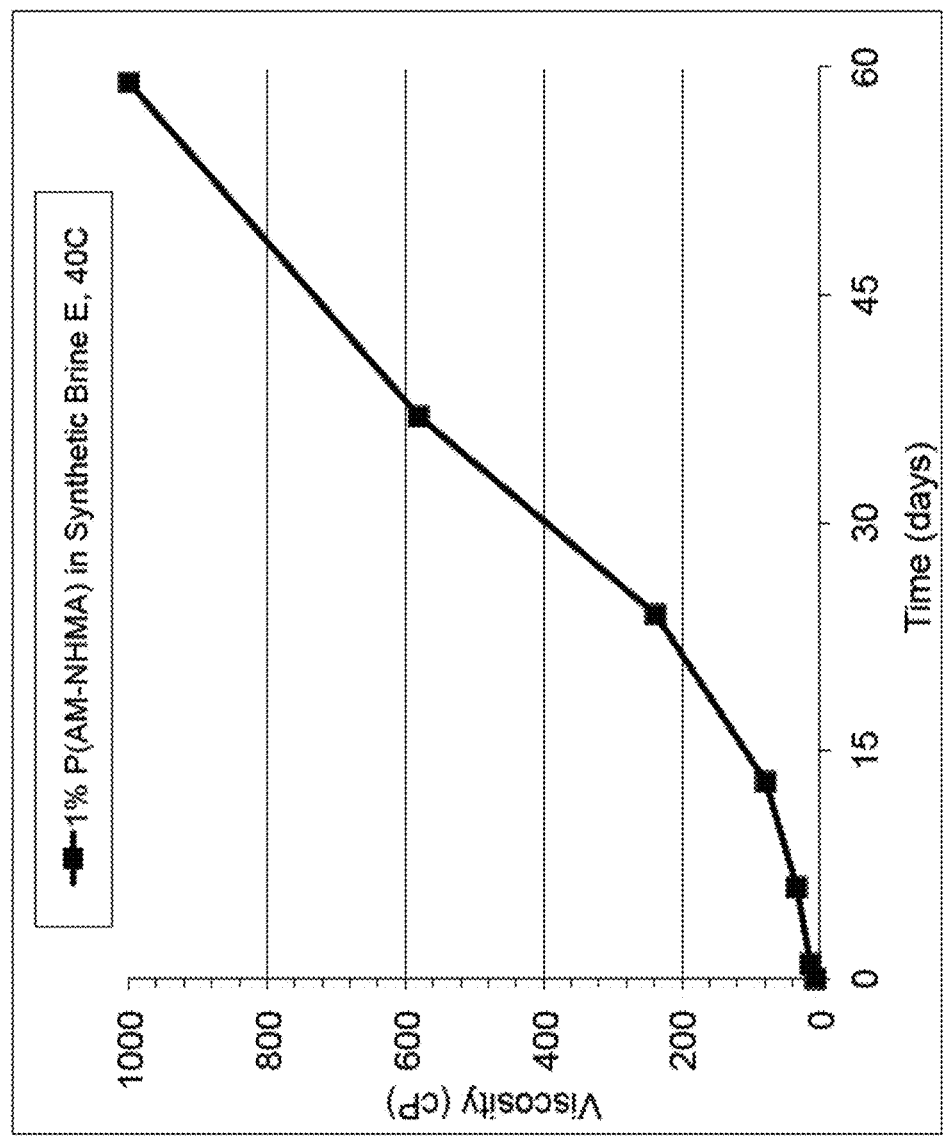
FIG. 11. Self-crosslinking of 1% poly(AM-NHMA) in Synthetic Brine E at 40° C.

The results for self-crosslinking of poly(AM-NHMA) in Synthetic brine E are shown in FIG. 11. As this graph shows, the viscosity of the solution increased with aging time at 40° C., reaching 1000 cP after around 60 days.

Figure 12:
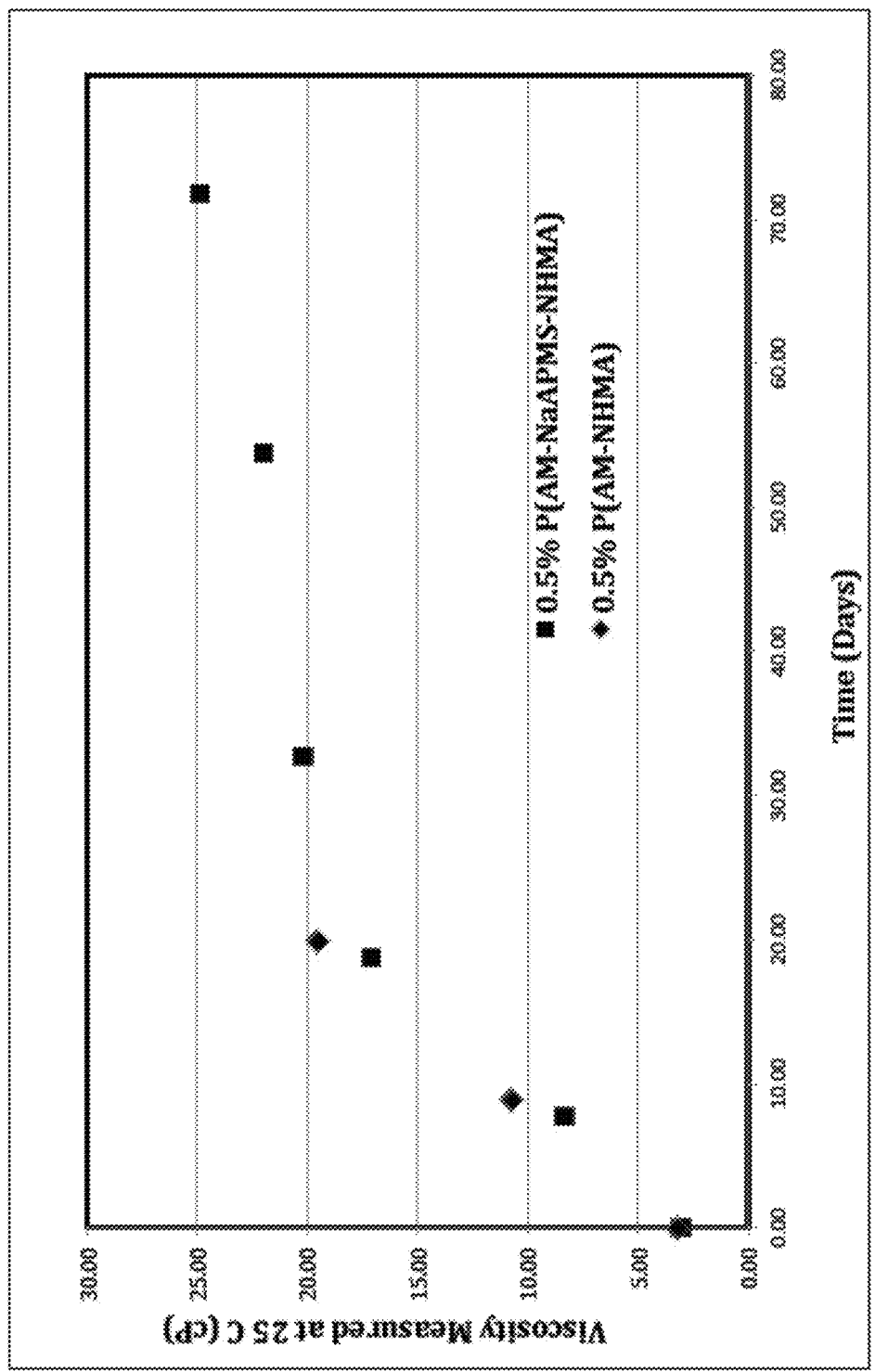
FIG. 12 Self Crosslinking of 0.5% poly(AM-NHMA) and 0.5% poly(AM-NaAMPS-NHMA) in synthetic Brine D under 1000 psi $CO_2$ at 108° F.

Self Crosslinking of 0.5% Poly(AM-NaAMPS-NHMA) and Poly(AM-NHMA) under $CO_2$: The low pH polymer was inverted and dispersed in the synthetic Brine D in an anaerobic chamber. The polymer dispersion was then loaded into several pressure vessels. The vessels were capped and removed from the anaerobic chamber. $CO_2$, at about 850 psi, was charged into the pressure vessels at room temperature using a gas booster pump. The vessels were then placed in a 42° C. oven. The pressure inside the vessels was monitored to maintain ~1000 psi, wherein the $CO_2$ was released if pressure needed to be reduced. Viscosity measurements of the polymer were taken periodically. Here, a pressure vessel was removed from the oven, the gas was released, and the polymer was taken out of the vessel for viscosity measurement. FIG. 12 shows the viscosity versus time of aging under $CO_2$ for 0.5% poly(AM-NaAMPS-NHMA) and poly (AM-NHMA) in Brine D measured at 25° C. The viscosity of both polymers increased with aging under $CO_2$, indicating self-crosslinking. The test is continuing at this time.

Thus, poly(AM-NaAMPS-NHMA) and poly(AM-NHMA) can both self-crosslink and can also crosslink with organic crosslinkers (such as catechin) at low pH, resulting in an increase viscosity of polymer solution and/or gel formation. These polymers are good candidates for profile control and water shutoff application in reservoirs, particularly under $CO_2$ flooding which results in acidic conditions as the $CO_2$ partitions into the connate water.

Each of the following references are incorporated herein in their entirety for all purposes.

Martin, F. D., and Kovarik, F. S., "Chemical Gels for Diverting $CO_2$: Baseline Experiments," Paper SPE 16728, presented at the 62nd Ann. Tech. Conf. and Exhib., Dallas, Tex., Sep. 27-30, 1987.

Martin, F. D., and Kovarik, F. S., "Gels for $CO_2$ Profile Modification", Paper SPE 17330, presented at SPE/DOE Enhanced Oil Recovery Symposium, Tulsa, Okla., Apr. 17-20, 1988.

Senol, N. N., "Laboratory Studies on Polymer Gels for $CO_2$ Mobility Control at Bat Raman Heavy Oilfield, Turkey," Paper SPE 50798, Presented at 1999 SPE International Symposium on Oilfield Chemistry, Houston, Tex., Feb. 16-18, 1999.

Hild, G. P. and Wackowski, R. K., "Reservoir Polymer Gel Treatments to Improve Miscible $CO_2$ Flood," SPE Reservoir Eval. & Eng. 2(2), April 1999, pp 196-204.

Asghari, K., and Taabbodi, L., "Laboratory Investigation of Indepth Gel Placement for Carbon Dioxide Flooding in Carbonate Porous Media," Paper SPE 90633, Presented at the 2004 SPE International Petroleum Conference, Mexico, Nov. 8-9, 2004.

Taabbodi, L. and Asghari, K., "Application of In-Depth Gel Placement for Water and Carbon Dioxide Conformance Control in Carbonate Porous Media," Paper 2004-168 Presented at the 5th Canadian International Petroleum Conference, Calgary, Jun. 8-10, 2004.

Taabbodi, L. and Asghari, K., " Application of In-Depth Gel Placement for Water and Carbon Dioxide Conformance Control in Carbonate Porous Media," JCPT, February 2006, Vol. 45, No 2, pp 33-40.

Freidmann, F., Hughes, T. L., Smith M. E., Hild, G. P., Wilson, A. and Davies, S. N., "Development and Testing of a Foam-Gel Technology to Improve Conformance of Rangely $CO_2$ Flood," SPE Reservoir Eval. & Eng. 2(2), February 1999, pp 4-13.

Wassmuth, F. R., Green, K. and Hodgins, L., "Conformance Control for Miscible $CO_2$ Floods in Fractured Carbonates," Paper 2005-243, presented at Canadian International Petroleum Conference, Calgary, Jun. 7-9, 2005.

Huh, C., Choi, S. K. and Sharma M. M., "A Rheological Model for pH-Sensitive Ionic Polymer Solutions for Optimal Mobility Control Applications," Paper SPE 96914 presented at 2005 Ann. Tech. Conf. and Exhibition, Dallas, Tex., Oct. 9-12, 2005.

Sharma, M. M., Bryant S. and Huh, C., "pH Sensitive Polymers for Improving Reservoir Sweep and Conformance, " U.S. Department of Energy, National Energy Technology Laboratory, Semiannual Progress Report May 1, 2006 to Sep. 30, 2006.

Raje, M., Asghari, K., Vossoughi S., Green, D. W. and Willhite, G. P., "Gel Systems for Controlling $CO_2$ Mobility in Carbon Dioxide Miscible Flooding," SPE Reservoir Eval. & Eng. 2 (2), April. 1999, pp 205-210.

Raje, M., Asghari, K., Vossoughi S., Green, D. W. and Willhite, G. P., "Gel Systems for Controlling $CO_2$ Mobility in Carbon Dioxide Miscible Flooding," Paper SPE/DOE 35379, presented at he 1988 SPE/DOE Tenth Symposium on Improved Oil Recovery, Tulsa, Okla. Apr. 21-24, 1988.

The invention claimed is:

1. A method of improving sweep efficiency of a $CO_2$ flood of a reservoir, said method comprising:
   a) injecting a composition into said reservoir, said composition comprising a polymer with one or more acrylamide based monomers in the repeat unit, wherein one of said acrylamide based monomers has pendant hydroxyl groups, a fluid, and an optional phenolic crosslinker, wherein said polymer has a first viscosity at pH 8 and a second higher viscosity to form a gel when aged at a pH less than 5;
   b) aging the composition to increase its viscosity or form a gel;
   c) injecting a slug of $CO_2$ into said reservoir, wherein said $CO_2$ reduces a viscosity of oil; and producing said reduced viscosity oil,
   wherein said $CO_2$ is co-injected with said composition.

2. The method of claim 1, wherein said aging is at least 20 days.

3. The method of claim 1, wherein said aging is at least 40 days.

4. The method of claim 1, wherein the pH of the reservoir is acidic due to $CO_2$ injection.

5. The method of claim 1, wherein the pH of the reservoir is acidic due to inclusion of an ester in said composition, wherein said ester produces acid upon hydrolysis to reduce the pH.

6. An improved method of $CO_2$ flooding, wherein $CO_2$ is injected into a reservoir to mobilize and produce oil, the improvement comprising injecting a composition into a reservoir, aging said composition to increase its viscosity or form a gel, injecting $CO_2$ into said reservoir thus reducing the viscosity of the oil, wherein said $CO_2$ is co-injected with said composition, and producing said oil, said composition comprising a polymer with one or more acrylamide based monomers in the repeat unit, wherein one of said acrylamide based monomers has pendant hydroxyl groups, a fluid, and an optional phenolic crosslinker, wherein said polymer has a first viscosity at pH 8 and a second higher viscosity to form a gel when aged at a pH less than 5.

* * * * *